United States Patent [19]
Poggio et al.

[11] Patent Number: 5,745,668
[45] Date of Patent: Apr. 28, 1998

[54] EXAMPLE-BASED IMAGE ANALYSIS AND SYNTHESIS USING PIXELWISE CORRESPONDENCE

[75] Inventors: Tomaso Poggio, Wellesley; David J. Beymer, Cambridge; Amnon Shashua, Cambridge, all of Mass.

[73] Assignee: Massachusetts Institute of Technology, Cambridge, Mass.

[21] Appl. No.: 797,993

[22] Filed: Feb. 12, 1997

Related U.S. Application Data

[63] Continuation of Ser. No. 697,001, Aug. 16, 1996, abandoned, which is a continuation of Ser. No. 112,898, Aug. 27, 1993, abandoned.

[51] Int. Cl.$^6$ .................................................. G06T 1/40
[52] U.S. Cl. ............................................. 395/175; 382/156
[58] Field of Search .................................. 395/118, 127, 395/141, 173, 175, 21, 23; 382/156, 157, 159, 201, 236; 348/15, 17, 19

[56] References Cited

U.S. PATENT DOCUMENTS

| | | | |
|---|---|---|---|
| 4,600,919 | 7/1986 | Stern | 340/725 |
| 4,663,660 | 5/1987 | Fedele et al. | 358/136 |
| 4,672,444 | 6/1987 | Bergen et al. | 358/140 |
| 4,797,836 | 1/1989 | Witek et al. | 364/518 |
| 5,025,282 | 6/1991 | Nakamura et al. | 355/38 |
| 5,029,997 | 7/1991 | Faroudja | 352/54 |
| 5,041,916 | 8/1991 | Yoshida et al. | 358/433 |
| 5,067,014 | 11/1991 | Bergen et al. | 358/105 |
| 5,184,218 | 2/1993 | Gerdes | 348/424 |
| 5,187,592 | 2/1993 | Sugiyama et al. | 358/430 |
| 5,245,672 | 9/1993 | Wilson et al. | 382/9 |
| 5,247,583 | 9/1993 | Kato et al. | 382/9 |
| 5,261,041 | 11/1993 | Susman | 395/152 |
| 5,416,899 | 5/1995 | Poggio et al. | 395/152 |

OTHER PUBLICATIONS

Kent, J. R., et al., "Shape Transformation for Polyhedral Objects", Computer Graphics, Jul. 1992, pp. 47–54.

Tian–Hu Yu, et al., "A Simple Image Analysis/Synthesis Technique and Its Application in Image Coding", The International Society for Optical Engineering, 1990, pp. 161–170.

Poggio, T., et al., "Networks for Approximation and Learning", Proceedings of the IEEE Sep. 1990, USA, vol. 78, NR. 9, pp. 1481–1497.

Pearson, Don, "Image Processing", McGraw–Hill, Maidenhead, Berkshire, England, 1991, pp. 237, ¶ 1; pp. 239, ¶ 3; p. 242, ¶2.

(List continued on next page.)

*Primary Examiner*—Joseph H. Feild
*Assistant Examiner*—Stephen Hong
*Attorney, Agent, or Firm*—Fenwick & West LLP

[57] ABSTRACT

Synthesis of novel images from example images is achieved by determining a pixelwise optical flow among example images, computing a parameter set for a new image, and synthesizing the new image based on the parameter vector and the example images. The parameter set may describe characteristics of the image, in which case the characteristics are applied to a neural network trained with the example images in order to synthesize the novel image. The parameter set may also be an estimate of relative contributions of each of the example images to the new image, in which case the new image may be synthesized by taking a linear combination of the example images, weighted by the parameter set. In one embodiment, both the example and the new images are of the same object. In another embodiment, the example image represents a first object while the new image represents a second object. In yet another embodiment, a set of target images is synthesized from a single target image and a set of source images. Analysis of existing images to determine image parameters is achieved by determining parameters for the existing image based on comparison of the existing image with an image set for which parameters are known.

20 Claims, 10 Drawing Sheets

OTHER PUBLICATIONS

Chen, S. E., et al., "*View Interpolation for Image Synthesis*", Computer Graphics Proceedings, 1993, pp. 279–288.

Poggio, T., and Brunelli, R., "*A Novel Approach to Graphics*" MIT Center for Biological Information Processing, Paper No. 71, Feb. 1992, pp. 1–17.

Peter Litwinowicz, "Inkwell: A 2½–D Animation System", Computer Graphics 25(4): 113–121 (Jul. 1991).

J.R. Bergen and R. Hingorani, "Hierarchical Motion–Based Frame Rate Conversion," David Sarnoff Research Center Technical Report, 1990, pp. 4–8.

Tomaso Poggio and Roberto Brunelli, "A Novel Approach to Graphics," Massachusetts Institute of Technology Artificial Intelligence Laboratory Memo No. 1354, Massachusetts Institute of Technology Center for Biological Information Processing Paper No. 71, Feb. 1992, pp. 1 –17.

Edward B. Gamble, Davi Geiger, Tomaso Poggio and Daphna Weinshall, "Integration of Vision Modules and Labeling of Surface Discontinuities," *IEEE Transactions on Systems, Man and Cybernetics*, vol. 19, No. 6, Nov./Dec. 1989, pp. 1576–1581.

Shenchang Eric Chen and Lance Williams, "View Interpolation for Image Synthesis," Association for Computing Machinery Computer Graphics Proceedings (SIG graph 93), Aug. 1993, pp. 279–288.

Tomaso Poggio and Federico Girosi, "A Theory of Networks for Approximation and Learning," Massachusetts Institute of Technology Artificial Intelligence Laboratory Memo No. 1140, Massachusetts Institute of Technology Center for Biological Information Processing Paper No. 31, Jul. 1989, pp. 1–85.

Amnon Shashua, "Correspondence and Affine Shape from two Orthographic Views: Motion and Recognition," Massachusetts Institute of Technology Artificial Intelligence Laboratory Memo No. 1327, Dec. 1991, pp. 1–35.

Tomaso Poggio and Federico Girosi, "Regularization Algorithms for Learning That Are Equivalent to Multilayer Networks," *Science*, vol. 247, Feb. 23, 1990, pp. 978–982.

Bruce D. Lucas and Takeo Kanade, "An Iterative Image Registration Technique with an Application to Stereo Vision," Computer Science Department, Carnegie–Mellon University, date unknown, pp. 121–130.

Ando, "Dynamic Reconstruction of 3D Structure and 3D Motion", 1991 IEEE Workshop on Visual Motion, pp. 101–110.

Gutierrez et al., "Computing Optical Flow in Cardiac Images for 3D Motion Analysis", Computers in Cardiology, 1993, pp. 37–40.

Ohya et al., "Real–time Reproduction of 3D Human Images in Virtual Space Teleconferencing", 1993 Int'l Symposium on Virtual Reality, pp. 408–414.

Lamberti et al., "Optical Computation in 2–D Enchocardiography", *Computers in Cardiology*, 1991, pp. 489–492.

5,745,668

EXAMPLE-BASED IMAGE ANALYSIS AND SYNTHESIS USING PIXELWISE CORRESPONDENCE

This is a continuation of application Ser. No. 08/697,011 filed Aug. 6, 1996, abandoned, which is continuation of application Ser. No. 08/112,898, filed Aug. 27, 1993 abandoned.

SUBJECT INVENTION

The present invention is a subject invention under contracts N00014-91-J-1270 and N00014-92-J-1879 with the United States Government, and as such the United States Government has rights therein.

FIELD OF THE INVENTION

The present invention relates generally to image processing, and specifically to the generation of novel images by pixelwise analysis and comparison of example images.

DESCRIPTION OF BACKGROUND ART

Numerous schemes have been proposed to simplify the difficult and time-consuming tasks of transmitting, synthesizing and modifying images stored in electronic form.

A large number of image compression techniques are known for transmitting image data over limited bandwidth channels. These techniques have typically evolved from general signal and data compression techniques used, for instance, in signaling, telephone, radio, television and data processing applications. The known techniques vary widely in effectiveness, depending on the applications to which they are put.

In another area, numerous attempts have been made to simplify the task of generating a series of related images. Traditional techniques have relied on the creation of individual two-dimensional frames that, when presented in succession quickly enough, are perceived by the human eye as an animated image. Each two-dimensional frame is typically independently created. Thus, in the case of a motion picture, a photograph is made for every frame. In the case of a graphical animation, a new graphic is created for each frame.

To obviate the need for manual creation of each frame, computer-assisted techniques have been used to create three-dimensional models of the objects comprising the image, and further computer-assisted techniques have been used to modify the presentation of such models to achieve animation. Such systems obviate the need for actual imaging of each frame because any desired view may be computed based on the stored object models. However, three-dimensional modeling systems typically suffer from significant processing and memory burdens. For example, using current technology it is extremely difficult to model and process three-dimensional representations of complex objects such as human faces.

In yet another area, a number of techniques are known for creating a modified image from a pair of example images by interpolating between the example images. For instance, a popular technique known as "morphing" is now commonly used in the motion picture industry to provide the illusion of a gradual metamorphosis of one object into another. Known morphing techniques rely on developing a correspondence between "control points" on a first object and those on a second object. For example, in morphing one person's image to another, a correspondence between facial features such as the noses, left pupils, right pupils, left mouth corner points, and right mouth corner points may be specified. As might be expected, the more numerous the control points, the more accurate the interpolation will be. However, there is generally a non-zero cost to the assignment of additional control points. If control points are manually assigned, human limitations preclude the use of more than a small number of control points. If automatic schemes are used to assign control points, the likelihood of incorrect assignments increases with the number of control points. For instance, it may be relatively simple to automatically recognize left eyes in the images of two people and assign corresponding control points, but it may be far more difficult to attempt to recognize sideburns or other features. Thus, correspondence of a very large number of control points, for example pixel-by-pixel correspondence, has been proposed only for cases where the original images are computer-generated images allowing pre-computation of such correspondence based on the models used to generate the original images. Such a scheme is suggested in Chen and Williams, *View Interpolation for Image Synthesis*, ASSOCIATION FOR COMPUTING MACHINERY COMPUTER GRAPHICS PROCEEDINGS (SIGGRAPH 93) at 279 (August 1993).

Furthermore, known morphing techniques can only interpolate new images between two given images, and provide very little parametric control over such new images. Typically, the only parameter available is one-dimensional and concerns the "closeness" of the new image to either one of the two given images.

The limitations of the known implementations have heretofore circumscribed the uses and applications for image processing techniques such as morphing and further have slowed the development of image processing applications such as low-bandwidth teleconferencing that might benefit from an implementation not burdened by such limitations.

DISCLOSURE OF INVENTION

In accordance with the present invention, image processing is accomplished by determining vector representations of two or more example images by approximating pixelwise (i.e., pixel-by-pixel) optical flows among the example images, determining a desired parameter set for a new image, and synthesizing the new image from the plural example images, based on the vector representations and parameter set.

In a further aspect of the invention, image parameters of an existing image are estimated based on analysis using a set of training images for which parameters are known.

In another aspect of the invention, images are transmitted from one location to another by first transmitting training images to a reception location, then determining pixelwise optical flows from a subsequent image to the training images, determining a parameter set for the subsequent image relative to the training images, transmitting the parameters to the reception location, and synthesizing the subsequent image at the reception location.

In yet another aspect of the invention, new target images are synthesized from image parameters by mapping such parameters from a source image set to a target image set, determining image parameters for an image in the source image set based on pixelwise optical flow among the source images, and then synthesizing a new target image from the target image set by applying the determined image parameters to the target image set.

In still another aspect of the invention, a novel image is generated from a set of coefficient parameters by using a linear combination of existing images, with contributions from each existing image determined by the coefficient parameters.

In yet one more aspect of the invention, novel images are synthesized from a single example image by determining a mapping for pixelwise image changes using prototype image changes and by using pixelwise correspondence of the example and prototype images.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BEST MODE FOR CARRYING OUT THE INVENTION

The figures depict a preferred embodiment of the present invention for purposes of illustration only. Those skilled in the art will readily recognize from the following discussion that alternative embodiments of the structures and methods illustrated herein may be employed without departing from the principles of the invention described herein.

Figure 1:
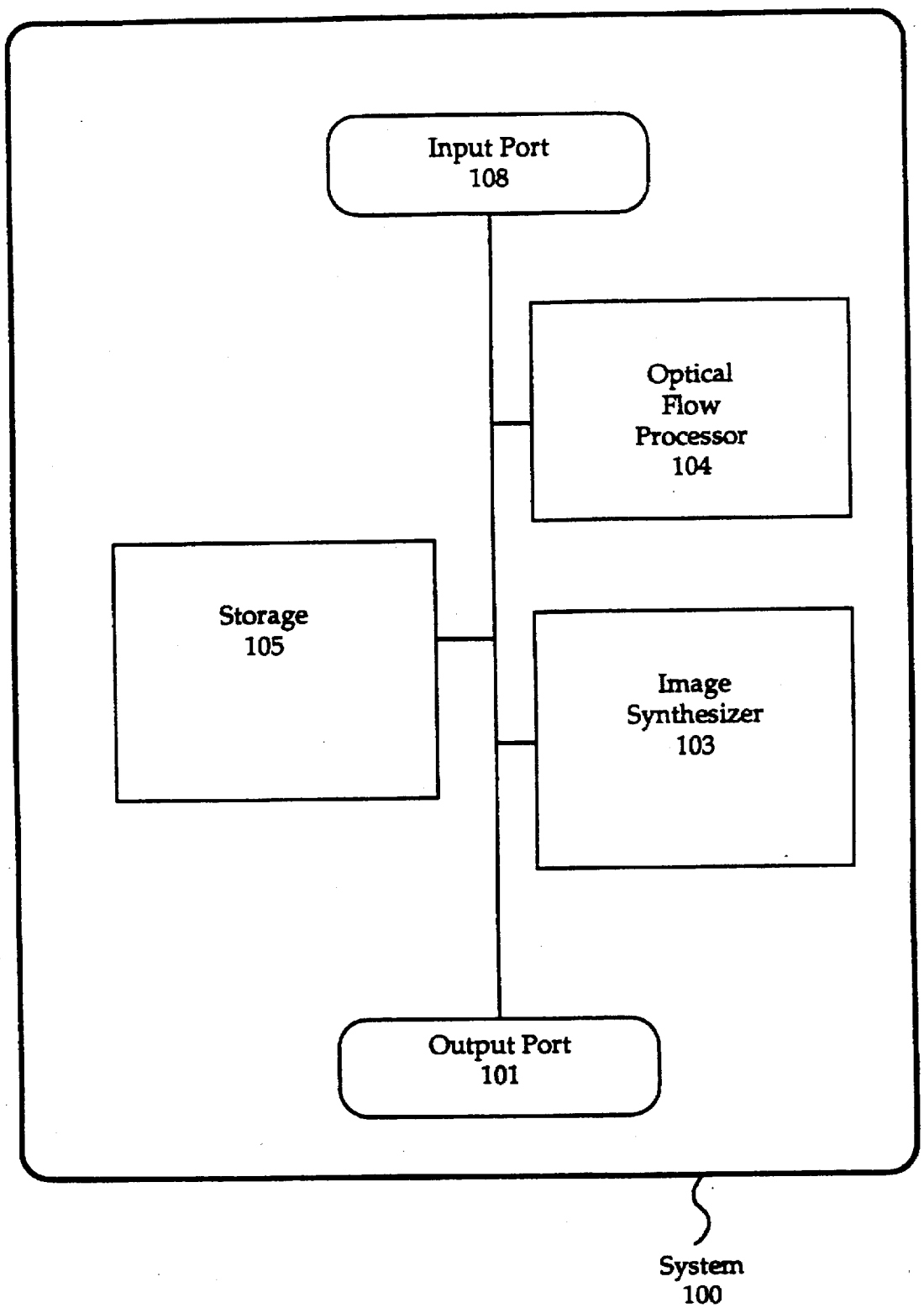
FIG. 1 is a block diagram of an image processing system (100) in accordance with the present invention.

Referring now to FIG. 1, there is shown an image processing system 100 in accordance with the present invention. Image processing system 100 is comprised of an input port 108, a storage subsystem 105, an image synthesizer 103, an optical flow processor 104, and an output port 101. In operation, image information is applied to input port 108. Storage subsystem 105 serves as a memory for such image information, and also stores processing instructions and intermediate results. Optical flow processor 104 computes vector representations, or optical flows, of images applied to input port 108 and images stored in storage subsystem 105. Image synthesizer 103 generates new images, based on information in storage subsystem 105 and the processing provided by optical flow processor 104. The resulting images produced by image synthesizer 103 are applied to output port 101 for display, e.g., on a cathode ray tube monitor or printer, or for further conventional processing. The specific operation of subsystems 103–105 will be described below in connection with the processes illustrated in the other figures.

In a preferred embodiment, system 100 is implemented using a neural network to provide the function of image synthesizer 103. It should be recognized that any system capable of the processing described herein could also be used to implement system 100.

Figure 2A:
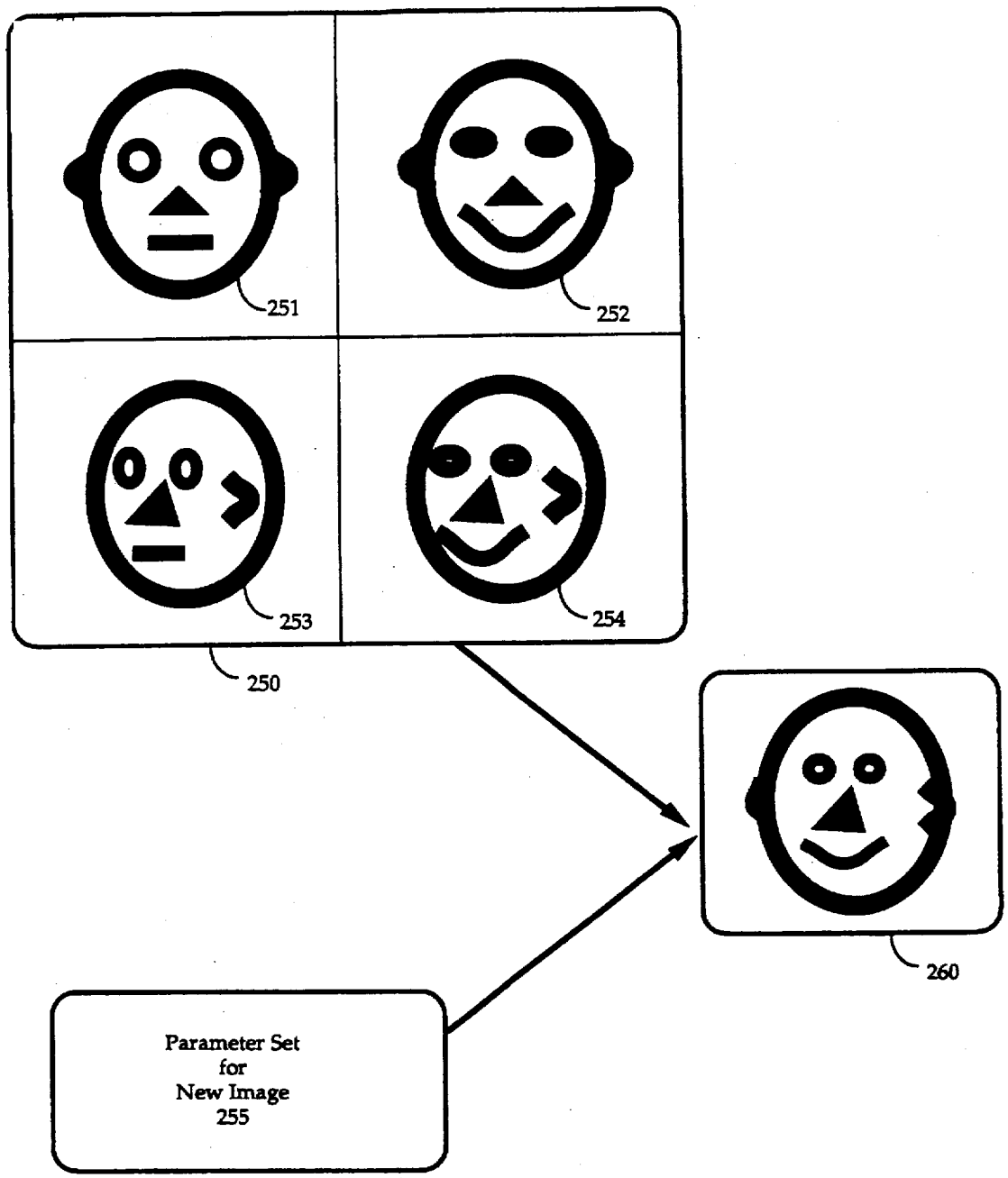
FIG. 2a illustrates the generation of a synthesized image (260) from a set of example images (250) and from parameter information (255) for a new image, in accordance with the present invention.

Referring now to FIG. 2a, there is illustrated the generation of a novel image 260 from a set 250 of example images 251–254 and from a parameter set 255 for the novel image 260. While the images of FIG. 2a are shown as black and white graphics for purposes of discussion herein, it should be noted that the system and method of the present invention is particularly well-suited for processing gray-scale and color images, such as those from a standard video camera. In this illustration, example set 250 involves two parameters, one for facial expression and the other for pose. Image 251 therefore represents an image of a face with a neutral expression and a frontal pose. Image 252 represents a smiling expression and a frontal pose. Image 253 represents a neutral expression and an oblique pose. Image 254 represents a smiling expression and an oblique pose. A coordinate system may be defined to represent these example images as follows: a first parameter $p_1$, representing amount of smile, ranges from 0 (images 251 and 253) to 1 (images 252 and 254); a second parameter $p_2$, representing angle of pose, ranges from 0 (angle illustrated in images 251 and 252) to 1 (angle illustrated in images 253 and 254). Thus, a generalized image $I(p_1, p_2)$ may be used to define each of the images in example set 250 merely by specifying values for $p_1$ and $p_2$. It should be recognized that while FIG. 2a depicts an example set 250 involving two dimensions of parameters, any number of different parameters may be employed, and any number of example images may be included in example set 250. Thus, in the general sense, any image in image set 250 may be defined as $I(p)$, where p is a vector of parameters of any desired dimension.

Use of such parameters also allows definition of novel images not included in example set 250. For example, a novel facial expression and pose may be defined by $I(0.5, 0.5)$, representing an expression between neutral and fully smiling and a pose between straight on and the oblique angle of images 253, 254. Thus, novel image 260 may be defined as $I(0.5, 0.5)$. As illustrated in FIG. 2a, novel image 260 may accordingly be synthesized by a trained network from knowledge of the example set 250 and the parameter set 255 for the novel image 260.

Known techniques have attempted to metamorphose gradually from one known image, e.g., image 251, to another known image, e.g., image 254, by use of intermediate interpolated images of the sort illustrated by novel image 260. Thus, they were typically limited to two examples and a one-dimensional parameter p defining how "close" the new image was to be to one or the other of the two example images. In addition, to determine the proper mapping from one image, e.g., image 251, to the other, e.g., image 254, known solutions have required the assignment of a discrete number of corresponding control points on each image. In early systems, such assignment was performed manually. Other systems employed automated means for assigning control points. In either event, typical control points for a facial image might be the pupils of each eye, the corner points of the mouth, the tip of the nose, and each earlobe. Thus, only a limited number of selected features were used to define a correspondence between two images. The conventional techniques were developed in response to a perceived tradeoff between the minimum number of control points needed to ensure acceptable mapping and the maximum number of control points that could reasonably be assigned using the known manual or automated techniques. See, e.g., Poggio and Brunelli, *A Novel Approach to Graphics*, MASSACHUSETTS INSTITUTE OF TECHNOLOGY ARTIFICIAL INTELLIGENCE LABORATORY MEMO NO. 1354, MASSACHUSETTS INSTITUTE OF TECHNOLOGY CENTER FOR BIOLOGICAL INFORMATION PROCESSING PAPER NO. 71 (February 1992), incorporated herein by reference (characterizing pixel-based approach as "naive").

Figure 2B:
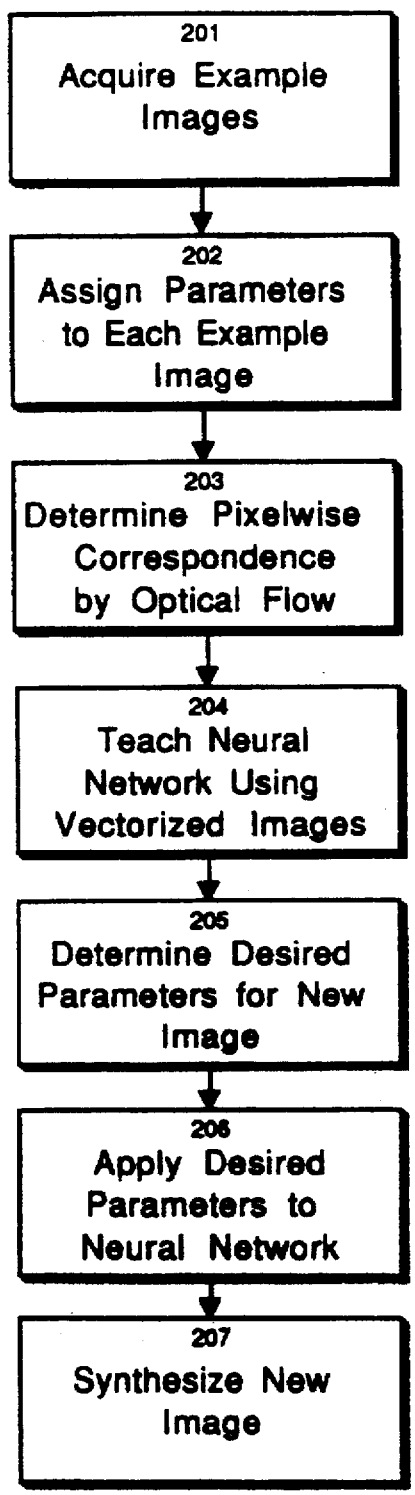
FIG. 2b is a flow diagram illustrating the steps used to generate the synthesized image (260) of FIG. 2a, in accordance with the present invention.

In accordance with the present invention, rather than assigning sparse control points as the basis for image mapping, optical flows of pixel maps of corresponding images are determined. This optical flow information provides data of extremely fine granularity over entire pixel maps so that very accurate image synthesis may be performed using multi-dimensional parameters. Referring still to FIG. 2a and now also to FIG. 2b for specifics as to a technique for image synthesis in accordance with the present invention, processing begins by acquiring example images 201, for instance, the images 251–254 of example set 250. Next, each such image is assigned parameters 202, as described above. The assignment of parameters may be performed either manually or automatically, depending on what each parameter represents and how readily such parameter may be discerned by automatic means. In the example illustrated in FIG. 2a, the parameters (0,0); (1,0); (0,1); and (1,1) are assigned manually to images 251–254, respectively.

Once example images are acquired and assigned parameters, a pixelwise correspondence among the images of the example set 250 is determined 203. In a preferred embodiment, an effort is made to determine which pixel in each image 251–254 corresponds with each pixel of the remaining images 251–254 in example set 250. Thus, an attempt is made to map each pixel of image 251 to a corresponding pixel in image 252, and to a corresponding pixel in image 253, and to a corresponding pixel in image 254. Since each image, e.g., 251, is a two-dimensional representation of a three dimensional object, and since that object has features that may appear and disappear as parameters change, there may be instances where a single pixel in one image maps to multiple pixels in another, or vice versa. By using a conventional bit-map coordinate system for pixel locations, a vector y may be assigned to each pixel of image 251 indicating how the location of that pixel changes (with respect to an arbitrary reference) as the expression and pose parameters change. Viewed another way, vector y is for each pixel a metric of the direction and distance between one image and another. In a preferred embodiment, this functionality is implemented in the optical flow processor 104 of FIG. 1. The vector y may therefore be thought of as a "vectorized" representation of an image.

The pixelwise correspondence described above is obtained by first providing a very rough correspondence between a pair of images, for instance by manually or automatically indicating correspondence between two points such as the centers of the left and right eyes. This provides rough geometric alignment between the images. Once the images are so aligned, an optical flow algorithm, such as an algorithm using a Laplacian pyramid of the two images, is applied. In a preferred embodiment, this algorithm uses a coarse-to-fine strategy that estimates shifts in pixel location at a coarse level first and then refines the estimates at ever finer levels of granularity. This allows both fast and accurate processing of images having large displacements, as well as precise processing of images having small displacements. It should be recognized that many other strategies could be used in accordance with the present invention.

In a preferred embodiment, the correspondence is determined by first applying an affine transformation to the images based on the left and right eye centers to obtain rough geometric alignment. Next, a very coarse correlation is performed to determine a desired direction for further warping of one of the images to make it match the other as closely as possible. As used herein, "warping" refers to the geometrical change in an image brought about by moving individual pixels along flow vectors. The change in pixel locations needed to achieve this warping is computed, and the image is so warped. The process then iterates, and a new, finer correlation is performed to determine a further estimate of change in pixel locations from one image to the other. The iteration continues until a threshold level of accuracy is achieved. Through proper bookkeeping of the change in pixel location with each iteration, a map of the change in locations for each pixel may be determined. Any algorithm for determining the change in pixel location may be used in accordance with the present invention. In a preferred embodiment, the general hierarchical motion estimation algorithm known in the art, and set forth for example in Shashua, *Correspondence and Affine Shape from two Orthographic Views: Motion and Recognition*, MASSACHUSETTS INSTITUTE OF TECHNOLOGY ARTIFICIAL INTELLIGENCE LABORATORY MEMO NO. 1327 (December 1991) and the references cited therein, particularly J. R. Bergen and R. Hingorani, *Hierarchical Motion-Based Frame Rate Conversion*, DAVID SARNOFF RESEARCH CENTER TECHNICAL REPORT (1990) is employed for this purpose. The Bergen-Hingorani pseudo-C code representation of the basic algorithm is given as:

```
From the two images I0 and I1 construct the corresponding
image pyramids G₀⁰, ..., Gₜ⁰, and G₀¹, ..., Gₜ¹
for (l=t; l≧0; l=l−1) {
    if (l==t) {
        Dxₗ= 0.0; Dyₗ=0.0;
    } else {
        Dxₗ = EXPAND (Dxₗ +1); Dyₗ=EXPAND (Dyₗ+1);
        Dxₗ=2*Dxₗ; Dyₗ= 2*Dyₗ;
    }
    Warp Gₗ⁰ with Dxₗ and Dyₗ to create image W
    Estimate motion between W and Gₗ¹ getting residual flow in Vx
    and Vy;
    Update motion: Dxₗ=Dxₗ+Vx; Dyₗ=Dyₗ+Vy;
    Smooth motion: SMOOTH (Dxₗ); SMOOTH (Dyₗ);
}
```

As suggested above, any technique that will provide pixelwise correspondence information for two images may be used, in accordance with the present invention. For instance, if the images of example set 250 were themselves synthesized using mathematical formulae, it may be possible to determine pixelwise correspondence by direct application of these formulae.

An optical flow may be defined for two corresponding pixels as simply a vector indicating a difference in the locations of those pixels. It is trivial to transform such information into a vector representation of each image, i.e., the optical flow between an arbitrary reference and that image. The pixel correspondence and optical flow functionality described here is performed by the optical flow processor subsystem 104 of FIG. 1.

Once a set of vector representations is computed for the images of example set 250, this information is used to teach system 100 in step 204 so that similar information may be used in the synthesis of novel images. System 100 is implemented, in a preferred embodiment, using a conventional neural network having as many input and output nodes as the number of pixels in the images to be processed, such as described in the above-referenced MASSACHUSETTS INSTITUTE OF TECHNOLOGY ARTIFICIAL INTELLIGENCE LABORATORY MEMO NO. 1354 and in the references cited therein. In a preferred embodiment, training of the neural network system 100 is achieved along with the steps of determining pixelwise correspondence and computing optical flow described above. Specifically, as optical flow processor 104 determines correspondences between pixels in the images of example set 250, the neural network that implements system 100 develops the weighting set for its nodes. Thus, after the correspondences are determined, the network is trained with respect to the parameters defined by the example set 250.

In mathematical terms, the general problem to be solved may be thought of as approximating a vector field (i.e., the vector representation defining the location of each corresponding pixel) from a set of data examples (i.e., the images of example set 250). If the vector field is denoted y(x), where x is a parameter vector such as amount of smile and angle of pose, then the example images may each be characterized by pairs $(y_i, x_i)$, where $y_i$ is the vector defining the ith example image and $x_i$ is the parameter vector for the ith example image.

In such a case, it is known that one may choose a regularization network or a generalized regularization network, having one "hidden" layer and linear output units, as an approximation scheme. In this case, the approximation may be given by:

$$y(x) = \sum_{i=1}^{n} c_i G(x - x_i) \qquad \text{(Eq. 1)}$$

where G is a Green function, n is the number of "centers" which in the case of such regularization networks is equal to the number of example images, and the values $c_i$ are weighting coefficients. In a preferred embodiment, the Gaussian function is used for Green function G, but other functions, such as those corresponding to multilinear correlation, could also be used. Equation 1 is more conveniently rewritten in matrix notation as:

$$y(x) = Cg(x) \qquad \text{(Eq. 2)}$$

where C is defined as the matrix in which row m is the vector $c_m$, and g is the vector with elements $g_i = G(x - x_i)$. If G is now defined as the matrix of the Green function evaluated at the examples, such that $G_{i,j} = G(x_i - x_j)$, then the "weights" c may be learned from the examples by solving:

$$Y = CG \qquad \text{(Eq. 3)}$$

for C, where Y is defined as the matrix in which column 1 is the example y1. Specifically, C is found by the following equation:

$$C = YG^+ \qquad \text{(Eq. 4)}$$

where $G^+$ represents the pseudoinverse of G.

The training discussed above, based on the images of example set 250, permits synthesis of a new image y by application of desired parameters x.

It should be recognized that the same equations may be used to permit estimation of parameters (e.g., for expression and pose) based on a new input image simply by changing variable definitions such that x represents the existing image to be analyzed and y represents the estimated parameters.

Following the training in step 204, processing flows to step 205 where the parameters 255 for a novel image are determined. In the example illustrated in FIG. 2a, the desired parameters may be predefined to be (0.5, 0.5) as discussed above. In other applications, parameters may also be determined through analysis of an existing image, as mentioned above and discussed in detail below in connection with FIGS. 3a, 3b, and 3c.

In step 206, these parameters are applied to the neural network system 100. Processing by the system 100 in step 207 synthesizes a novel image 260 from the information in example set 250 and the parameter set 255. Synthesis of novel image 260 once parameter set 255 has been determined is achieved through conventional neural network implementation using the same approximation techniques as described above in connection with Equations 1–4. Specifically, the above network approximation technique may be used to synthesize an output image vector y from an input parameter vector x. Such network generation of images is detailed, for example, in the MASSACHUSETTS INSTITUTE OF TECHNOLOGY ARTIFICIAL INTELLIGENCE LABORATORY MEMO NO. 1354 incorporated herein by reference above (but achieving correspondence through control point approach rather than pixelwise correspondence/optical flow approach). Yet further discussion of regularization theory and neural network implementation details is found in Poggio and Girosi, *A Theory of Networks for Approximation and Learning*, MASSACHUSETTS INSTITUTE OF TECHNOLOGY ARTIFICIAL INTELLIGENCE LABORATORY MEMO NO. 1140, MASSACHUSETTS INSTITUTE OF TECHNOLOGY CENTER FOR BIOLOGICAL INFORMATION PROCESSING PAPER NO. 31 (July 1989) and Poggio and Girosi, *Regularization Algorithms for Learning That Are Equivalent to Multilayer Networks*, SCIENCE, Vol. 247 at 978–982 (Feb. 23, 1990), both of which are incorporated herein by reference.

As an example of such image synthesis, consider synthesizing image 260 from example images 251–254 of example set 250, using the parameter conventions defined above. Assume that the parameters of image 260 are to be (0.5, 0.5). First, the approximation technique detailed above is used to determine the vectors y for images 251–254. Once correspondence between two images is established, the vector $\Delta y_{i,j}$ may be defined as the vector difference of the vectors associated with the two images i and j, or the vector representation of one image vector $y_j$ relative to the other $y_i$. Now a warping function may also be defined to allow synthesis of a new image from an existing image along a vector toward another existing image. Mathematically, this may be stated as:

$$y' = y + \alpha \Delta y \quad \text{(Eq. 5)}$$

where y' is the new image vector and α is a scaling factor, typically set to be equal to 1. Alternatively, an actual warping function that is equivalent to Equation 5 may be given as:

$$img' \leftarrow \text{warp}(img, \Delta y, \alpha) \quad \text{(Eq. 6)}$$

where img' is the new image and img is the existing image. A set of coefficients may be defined as:

$$b_i(x) = G(x - x_{s\_i}) \quad \text{(Eq. 7)}$$

where i identifies example images and ranges from 1 to 4 in the case illustrated in FIG. 2a, and G is as described above in connection with Equations 1–4. With these definitions in hand, an interpolated image $img_{int}(x,y)$, i.e., image 260, is given by:

$$img_{int}(x,y) \leftarrow \sum_{i=1}^{4} b_i(x,y) \text{warp}(img_i, \Delta y_{i,int}, \alpha) \quad \text{(Eq. 8)}$$

The image synthesis described herein is performed by image synthesizer 103 of FIG. 1. Both image synthesizer 103 and optical flow processor 104 are implemented, in the preferred embodiment, by a conventionally programmed general purpose digital computer.

Figure 3A:
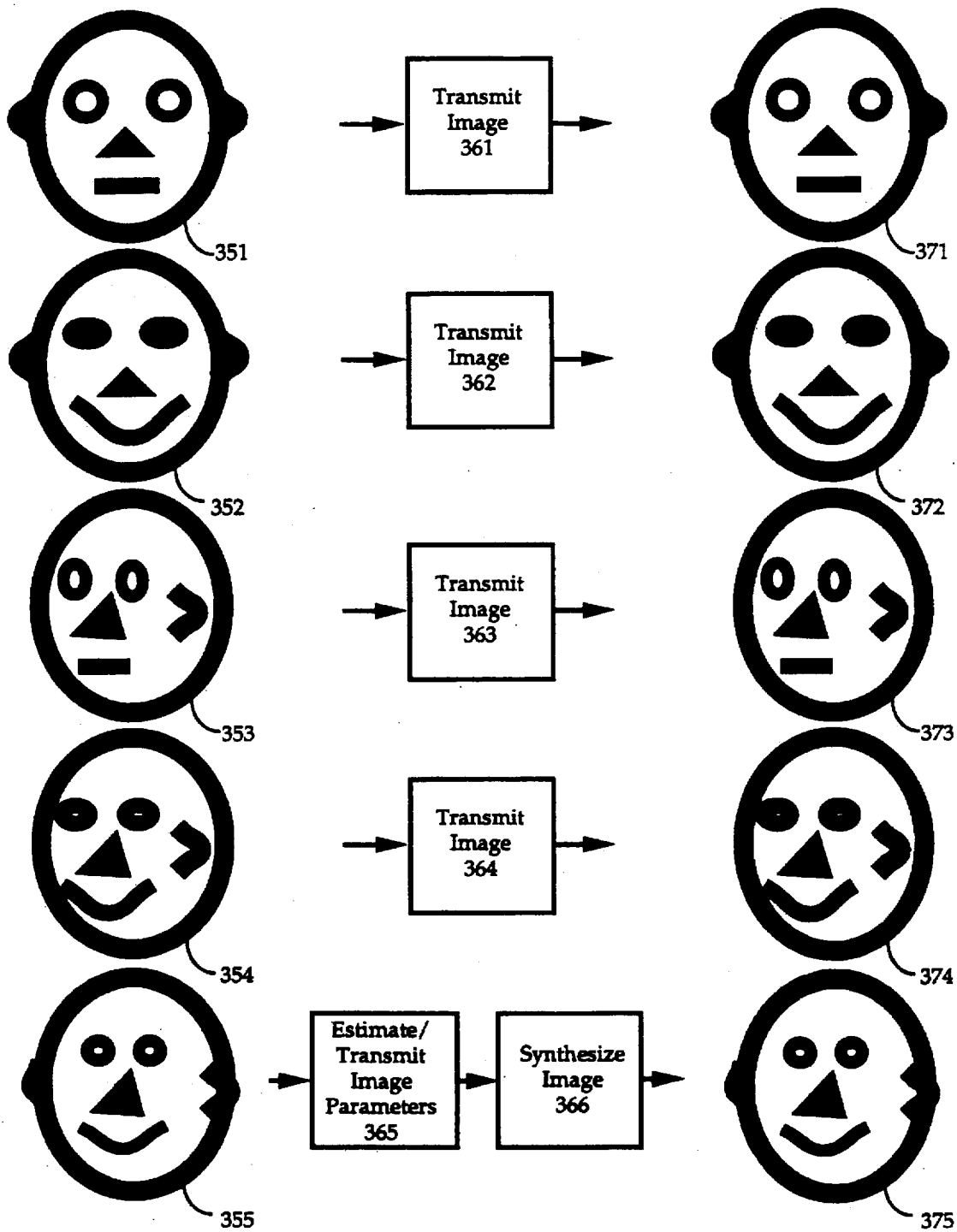
FIG. 3a illustrates the transmission of images and image parameters for synthesis of a new image (375), in accordance with the present invention.

Referring now to FIG. 3a, there is illustrated a technique for image transmission in accordance with the present invention. Using the concepts described above in connection with FIG. 2a, transmission of parameter information alone is sufficient for synthesis of an image at a receiver site once sufficient exemplary images have been transmitted. Specifically, by applying images 351–354 to transmission functions 361–364, received images 371–374 are made available at a reception location. The reception location then has, in effect, a set of exemplary images similar to the example set 250 of FIG. 2a from which to determine a pixelwise optical flow. Thus, in order to transmit a subsequent image 355, one need only estimate and transmit, using function 365, the image parameters of such subsequent image 355, and then apply the transmitted parameters to a synthesize image function 366 to generate a synthesized received image 375. In this manner, applications where image transmission bandwidth is a valuable and scarce resource may reduce the required bandwidth once a set of "training images", e.g., images 351–354, are available at the receiver location. An example of an application for such a technique is in teleconferencing, where a teleconference may reduce its required bandwidth after an initial training interval. If there is some other mechanism for making a training image set available, e.g., an image set stored from a previous teleconference, the need for full image transmission bandwidth may be obviated altogether.

Figure 3B:
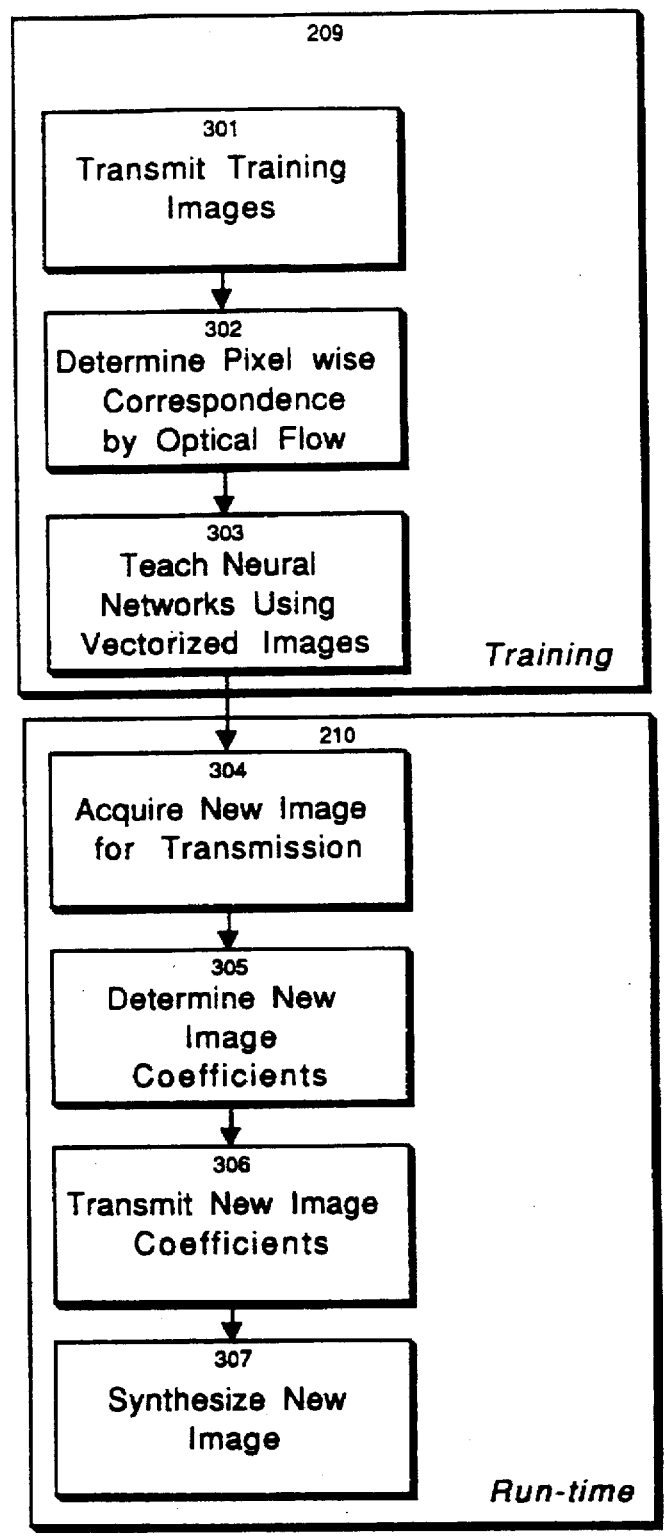
FIG. 3b is a flow diagram illustrating the steps used to generate the synthesized image (375) of FIG. 3a, in accordance with the present invention.
Figure 3C:
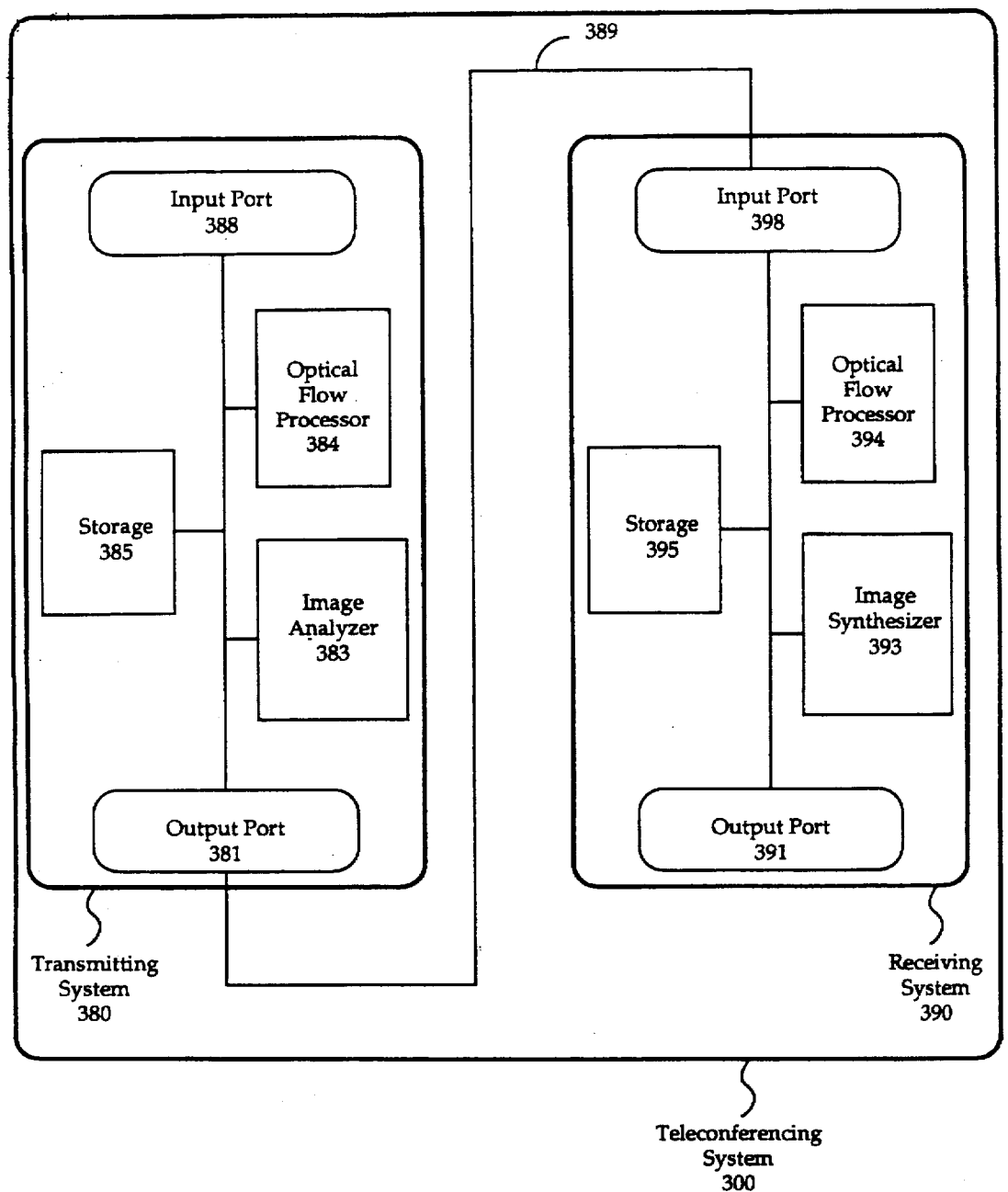
FIG. 3c is a block diagram of a teleconferencing system (300) in accordance with the present invention.

Referring still to FIG. 3a and now also to FIG. 3b for the processing steps of such a technique and FIG. 3c for a depiction of a teleconferencing system 300, processing begins by conventional transmission 301 of "training" images, i.e., images 351–354, from transmitting system 380 to receiving system 390 over communications channel 389. Next, pixelwise correspondences among training images 351–354 are determined by transmitting system 380 in step 302, as described above in connection with FIG. 2b, and from that information, pixelwise optical flows are computed 303 by optical flow processor 384, as described above in connection with FIG. 2b. Similarly, pixelwise correspondences and optical flows are also computed by receiving system 390 in steps 302 and 303 using optical flow processor 394.

The next step 303 is neural network training based on the information available at this point. In this case, both transmitting system 380 and receiving system 390 are implemented by neural network systems, and both systems are trained in the manner discussed in connection with FIGS. 2a and 2b, based on the training images 351–354 for transmitting system 380, and their received counterparts, images 371–374 for receiving system 390. Steps 301–304 comprise a training stage 310, and need be performed only once for any given set of training images, e.g., 351–354. In the case of transmitting system 380, image analyzer 383 is trained to estimate image parameters based on an applied image. In the case of receiving system 390, image synthesizer 393 is trained to synthesize new images from applied image parameters.

Once the transmitting network system 380 is trained, processing enters a run-free stage 320. Run-time stage 320 begins with step 304, in which novel image 355 may be applied to input port 388. Optical flow processor 384 and image analyzer 383 may then be used in step 305 to compare novel image 355 with one or more of the training images 351–354, which have been retained in storage 385, to determine an estimate of image parameters or coefficients for novel image 355. For example, system 380 may estimate pose parameters of image 355 to be (0.5, 0.5) using the parameter set described above in connection with FIGS. 2a and 2b.

Mathematically, training stage 310 results in the determination of a set of neural network coefficients as described above in connection with Equations 1–4. Once these coefficients are determined, application of a novel image x (e.g., image 355) to the image analyzer 383 of the transmitting system 380 affords computation of a parameter set y for this image using the same approximation technique as described above.

Once the parameters of novel image 355 are determined in step 305, they are then transmitted in step 306 from output port 381 of transmitting system 380 to input port 398 of receiving system 390 over communications channel 389. As previously mentioned, the four example images 351–354 have by this time already been transmitted from transmitting system 380 and received by receiving system 390 as images 371–372. This image information is stored in storage subsystem 395. Once these images have been received and stored, processing in receiving system 390 is essentially identical to the processing in system 100 discussed above in connection with FIGS. 1, 2a and 2b. The neural network receiving system 390 is by this time trained by having processed the training images 371–374 by optical flow processor 394 and image synthesizer 393 so that novel images may be synthesized solely from parameter information. Thus, in step 306, only image parameter information corresponding to image 355 is transmitted from output port 381 of transmitting system 380 to input port 398 of receiving system 390 via communications channel 389. The network system 390, having been so trained, now permits the processing in step 307 wherein image synthesizer 393 creates a synthesized image 375 from the transmitted parameters, in the same way as described in connection with FIGS. 2a and 2b, and applies the synthesized image 375 to output port 391.

In an alternative embodiment, the optical flow for a novel image 355 may be approximated by taking a linear combination of the N training images, i.e.:

$$y(x) = \sum_{i=1}^{N} b_i(x) y_i \qquad \text{(Eq. 9)}$$

where, as above, y(x) represents the optical flow for a novel image with respect to a reference image, $y_i$ represents optical flow for each example image, e.g., image 351, and $b_i$ represents a weighting coefficient for each example image, e.g., image 351. By finding the values of $b_i$ that provide the best estimate of y(x), these coefficients alone may be transmitted from transmitting system 380 to receiving system 390, with Equation 9 used again at receiving system 390 to reconstruct the vectorized representation of image 355, thereby allowing synthesis of image 375 by image synthesizer 393. The values of $b_i$ are given by the matrix formula:

$$b(x) = G^+ g(x) \qquad \text{(Eq. 10)}$$

or may be estimated using conventional least squares methods. This alternative technique may in some applications provide computational efficiencies compared with the equivalent formulation of Equation 1.

Under either the vector parameter method of Equation 1 or the linear combination of examples method of Equation 10, the image is effectively compressed for transmission by synthesis of new images through application of image parameters or coefficients to a trained network. Thus, the techniques described herein may be thought of as techniques not only for image analysis, synthesis, and transmission, but also for image compression.

As a variation on this technique, images 351–354 need not be transmitted at all to receiving system 390. Instead of loading receiving system 390 with transmitted images 371–374 arriving over communications channel 389 that represent the object of images 351–354, entirely new images, such as images of a second person, could be applied directly to input port 398 of receiving system 390. If the network receiving system 390 is thus trained with images of a second person, transmission of image parameters will result in synthesis of an image of the second person in the same pose and expression as the first person was in image 355. As another variation, images previously stored in storage subsystem 395 during a previous training stage 310 could be recalled at any time for use in run-time stage 320. Using this technique, stock training image sets of the person on the transmitting end, of a second person, or even a graphic image could be used for the training set, resulting in animation that is driven by the images on the transmitting end, even if each of those images does not look the same on the receiving end. As an example of just one such application, stock images of a person in a business suit may be used to synthesize images at a receiver location when the same person is participating in a teleconference from the transmitting location dressed in less formal attire.

As yet another variation, transmitting system 100 could also include an image synthesizer similar to the image synthesizer 393 of receiving system 390. The image synthesizer of transmitting system 100 could be used to check the fidelity of the synthesized image. Should the fidelity not meet a desired standard, a difference signal indicative of variation of the synthesized image from the actual image could be generated and transmitted by transmitting system 380, and then detected and interpreted by receiving system 390, to improve the quality of the synthesized image at the location of receiving system 390.

Figure 4A:
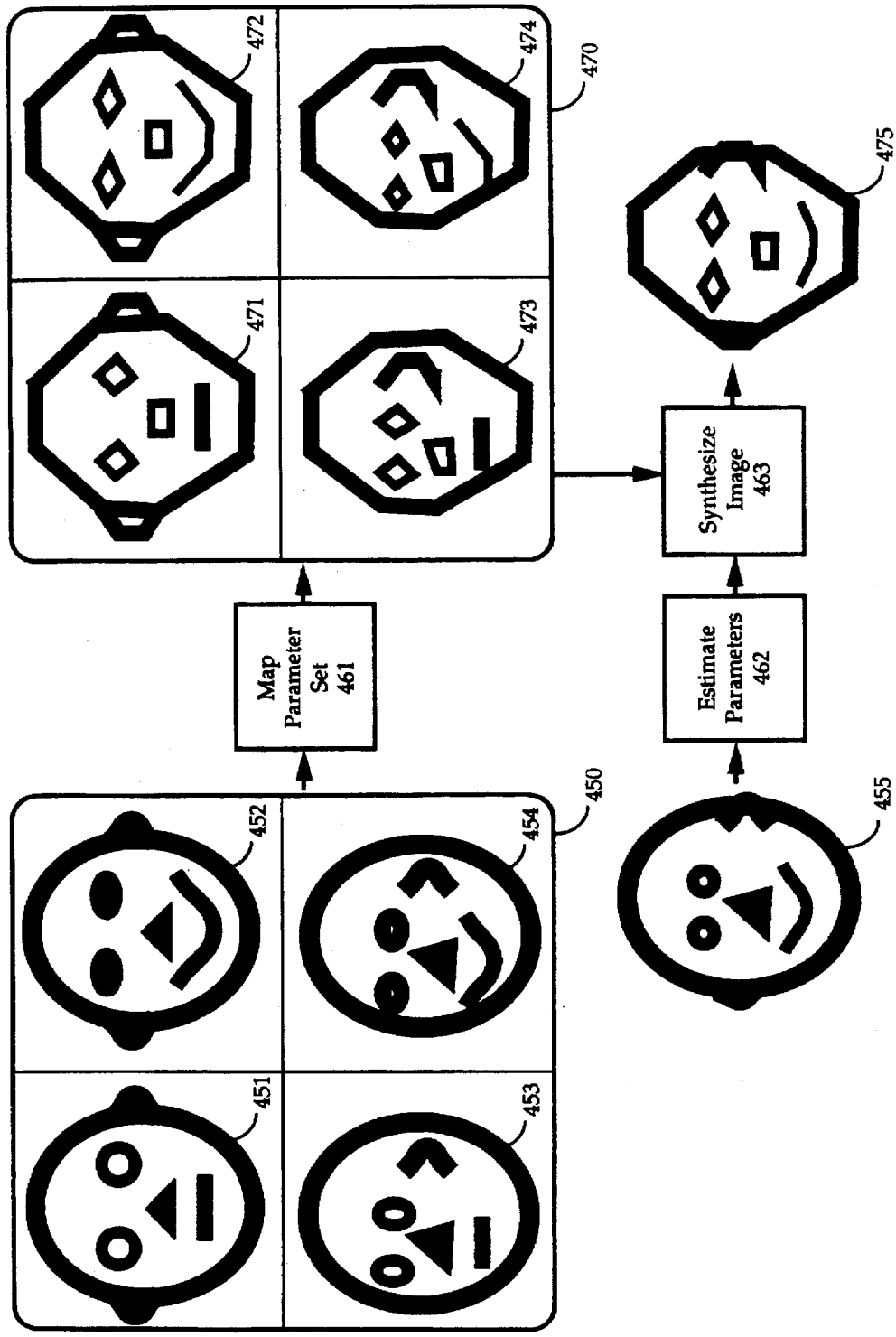
FIG. 4a illustrates the mapping of image parameters and the generation of a synthesized image (475) from a set of example images (470) and from parameter information from an existing image (455), in accordance with the present invention.

A further and more general extension of the image processing techniques discussed in connection with FIGS. 3a, 3b, and 3c is shown in FIG. 4a. There, a source image set 450 and a target image set 470 are each present. Image parameters associated with source image set 450 are mapped 461 to correspond with image parameters of target image set 470. Then image parameters of any novel source image, e.g., 455, are estimated 462 as described in connection with image analyzer 383 of FIG. 3c, and a new target image 475 is synthesized 463 from the target image set based on the parameters of novel source image 455. In one possible application, a movie star may have a particular manner of changing facial expressions and posing that others would like to emulate. By mapping parameters of the movie star in a static set of extreme expressions and poses to a static set of images of a second person in similar extreme expressions and poses, it is possible to synthesize intermediate images of the second person in a manner such that the dynamics of such expressions and poses for the second person (i.e., the way that the expressions and poses change with time) are driven by those of the movie star. As one example of an expansion of this application, the movements of famous dancers may be "mapped" to images of other people by mapping parameters sets as described above.

Figure 4B:
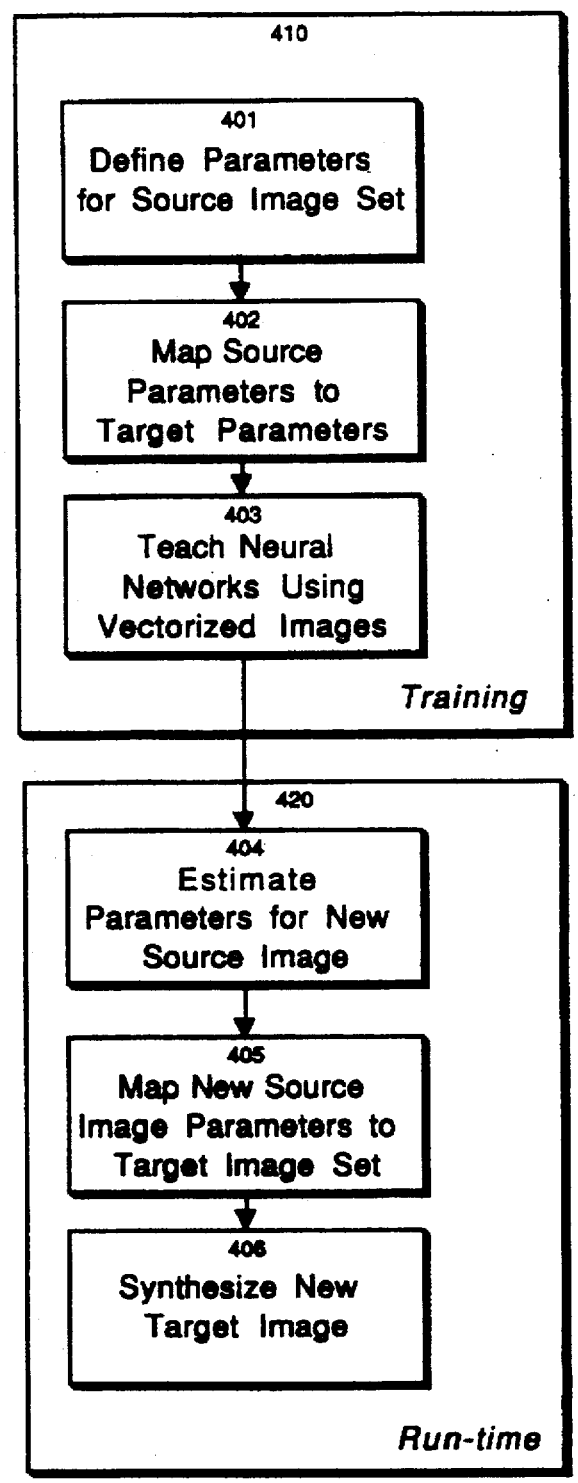
FIG. 4b is a flow diagram illustrating the steps used to generate the synthesized image (475) of FIG. 4a, in accordance with the present invention.

Referring now also to FIG. 4b, the processing flow for such mapping begins by defining, at step 401, parameters for the images of the source image set 451. Next, the source parameters so defined are mapped 402 to a corresponding set of parameters for the images of target image set 470. For example, if source image set 450 consists of four images 451–454 of a face, one a face-on pose with a neutral expression, a second a face-on pose with a large smiling expression, a third an oblique pose with a neutral expression and a fourth an oblique pose with a large smiling expression, and target image set 470 consists of four images 471–474 of a second person in like pose and expression, one simple mapping is to assign the same parameters to each of the images of target image set 470 as are used for the corresponding images of source image set 450. Once sets of source and target images with corresponding parameters are determined, the next step is to teach source and target neural networks, e.g., an image analyzer 383 and an image synthesizer 393, respectively. Steps 401 and 402 constitute a training stage 410.

Following training stage 410, processing enters a run-time stage 420. The first step 404 of run-time stage 420 is to determine the parameters for a new source image 465, in the manner described above in connection with FIG. 3b. Then, the parameters so determined are mapped to the target image set 470 in step 405 using the transformation as determined in step 402. In the simplest case, this may be a direct 1:1 correlation where source parameters (0.5, 0.5) map to target parameters (0.5, 0.5).

Once the target parameter analogs of the source parameters for new source image 465 are applied to the target image set 470, a novel target image 475 is synthesized in step 406 using the techniques described above in connection with FIG. 3b.

Figure 5A:
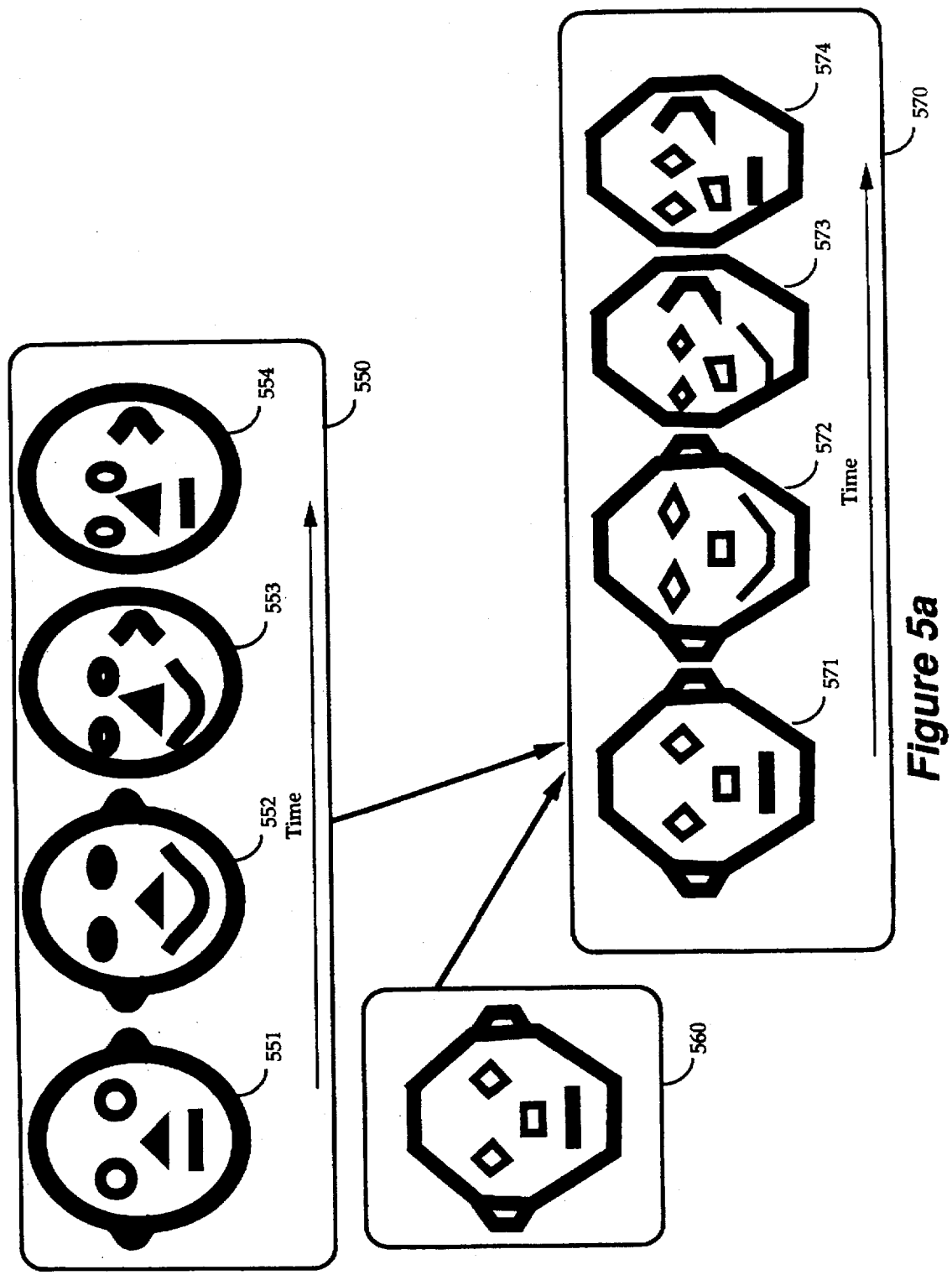
FIG. 5a illustrates the synthesis of a dynamic target image from a set of prototypical source images (550) and a single target image (560), in accordance with the present invention.

In yet another embodiment, novel images may be synthesized based on a single example image and a priori information regarding class-specific transformations that may be mapped from a prototype image set to the single example image. This technique may be useful in cases where there are not sufficient example images available to use the techniques described above, or more generally where images are known to change in a certain way with respect to a parameter space of more than two dimensions. In other words, if an image may be represented in a multidimensional parameter space, and if the manner of transformation is known over those parameters, novel images corresponding to changes in those parameters may be synthesized from a single example. As an illustrative example, and referring now to FIG. 5a, given knowledge of the manner in which a dynamic prototype image 550 changes with time, a static target image 560 may be used to synthesize a dynamic target image 570 that changes with time in a corresponding manner to that of prototype image 550.

Figure 5B:
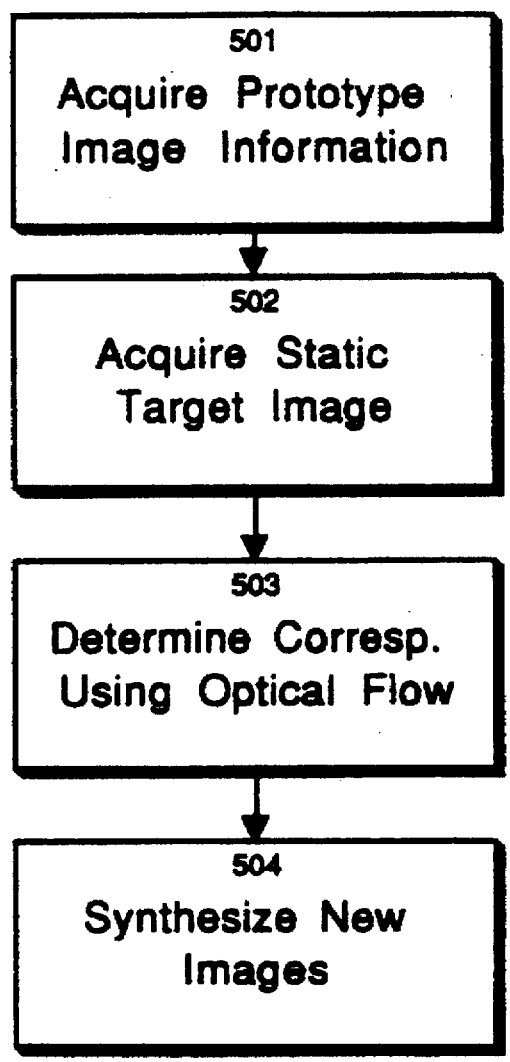
FIG. 5b is a flow diagram illustrating the steps used to generate the synthesized image (570) of FIG. 5a, in accordance with the present invention.

Referring now also to FIG. 5b, the process begins with the step 501 of acquiring prototype image information, i.e., the data corresponding to prototype image 550 as it changes, e.g., with time. In the case illustrated in FIG. 5a, the prototype image information consists of four temporally-sequential instances 551–554 of the same image, first face-on with a neutral expression 551, then smiling 552, then turning obliquely 553, then reverting to a neutral expression 554. Acquisition of prototype information here is equivalent to acquisition of an example image set 250 as discussed in connection with FIGS. 2a and 2b, and may be implemented identically thereto.

The next step 502 is to acquire static target image 560. Preferably, static target image 560 is sufficiently similar to prototype image 550 to be readily mapped thereto. In the example illustrated in FIG. 5a, static target image 560 is mapped to the first instance 551 of prototype image 550 (face-on, neutral expression) as discussed in connection with FIGS. 4a and 4b. At this point, correspondences may be determined 503 among the individual instances of prototype image 550 as well as with static target image 560. From this information, an optical flow for dynamic target image 570 may be determined. Specifically, the optical flows for static target image 560 relative to dynamic prototype image 550 define differences between dynamic prototype image 550 and dynamic target image 570, while the optical flows among the instances of dynamic prototype image 550 at various times define the manner in which dynamic target image 570 is to change with time, as illustrated by instances 571–574. In mathematical terms, the step of determining optical flows involves determining vectors indicating how a prototype image varies, e.g., with time. For instance, if image 550 is comprised of four static image instances, e.g., $I_1$ at time 1 through $I_4$ at time 4, then vectors $p_i$ may be defined, each characterizing an instance i of image 550 in terms of differences in location of corresponding pixels from one or more of the other instances of image 550, or from an arbitrary reference. Similarly, a vector parameter y may be defined characterizing static target image 560 in terms of differences in location of corresponding pixels from one or more instances of image 550, or from an arbitrary reference. Thus, if the static target image 560 corresponds to the first instance 551 of dynamic prototype image 550, static target image 560 may be used as the first instance 571 of dynamic target image 570. The second instance 572 of dynamic target image 570 is then determined by use of a new warping vector parameter $\tilde{y}$ defined as:

$$\tilde{y}=(p_2-p_1)+y \qquad \text{(Eq. 9)}$$

where $p_2-p_1$ represents the optical flow from prototype instance 552 to prototype instance 551 and where y represents the overall optical flow from dynamic prototype image 550 to static target image 560.

Once a vector parameter for each new target instance, e.g., 572 is defined, that instance of target image 570 may be synthesized in step 504 as described above in connection with FIG. 4b.

In application, the technique illustrated in FIGS. 5a and 5b may be used to provide animation to still images. For instance, a dynamic image of Abraham Lincoln talking may be synthesized from a single photograph of Mr. Lincoln and a dynamic prototype image of an actor talking.

The example discussed above in connection with FIGS. 5a and 5b is based on a prototype image 550 that is dynamic in the temporal sense. However, it should be recognized that the teachings set forth above may readily be applied to other situations in which objects within a given class undergo similar transformations in a multidimensional parameter space. For instance, the various expressions of the prototype may be static pictures taken at non-sequential times but changing according to some other parameter.

It should also be recognized that while the above discussion has focused on operations involving two-dimensional images, similar processing could be applied to three dimensional models or images as well.

Therefore, image synthesis, analysis, transmission and compression is achieved by determining pixelwise correspondences among images, computing pixelwise optical flows and vector representations therefrom, and using the resulting vectorized images to train a neural network with the mapping between images and corresponding parameter vectors, or between parameters and the corresponding images. The above description is included to illustrate the operation of preferred embodiments and is not meant to limit the scope of the invention. The scope of the invention is to be limited only by the following claims. From the above discussion, many variations will be apparent to those skilled in the art that would yet be encompassed by the spirit and scope of the invention.

We claim:

1. A method of synthesizing a new image from a plurality of example images, the example images and the new image each being comprised of a plurality of pixels and characterized by a parameter set, the method comprising:

analyzing said example images to determine pixelwise vector representations of said example images, the pixelwise vector representations providing pixel-by-pixel positions of said sample images with respect to a reference;

determining a desired parameter set for said new image; and synthesizing said new image from said example images using said pixelwise vector representations and said desired parameter set.

2. A method as in claim 1, wherein analyzing said example images to determine pixelwise vector representations includes determining pixelwise optical flows among each of the example images and the reference, and wherein the reference is derived from at least one of said example images.

3. A method as in claim 1, the method further comprising training a neural network with deformation information derived from optical flow applied to each of the example images such that subsequent application of the desired parameter set to the neural network results in said synthesizing.

4. A method of synthesizing a new image from a first example image and a second example image, the example images and the new image each being comprised of a plurality of pixels, the method comprising:

analyzing said first example image and said second example image to determine a pixelwise optical flow from said first example image to said second example image, the pixelwise optical flow providing a pixel-by-pixel relative position of said second example image with respect to said first example image;

determining a desired parameter set for said new image; and synthesizing said new image from said example images using said optical flow and said parameter set.

5. A method of transmitting images from a transmitting location to a receiving location, comprising:

transmitting a subset of said images as training images from said transmitting location to said receiving location;

determining a pixelwise optical flow for a subsequent image, the pixelwise optical flow providing a pixel-by-pixel position of said subsequent image with respect to a reference;

determining a parameter set for said subsequent image using the pixel-by-pixel position;

transmitting said parameter set from said transmitting location to said receiving location; and synthesizing a replica of said subsequent image at said receiving location using said training images and said transmitted parameter set.

6. A method as in claim 5, wherein said parameter set defines characteristics of said subsequent image.

7. A method as in claim 5, wherein said parameter set defines relative contributions of said training images, and wherein said replica of said subsequent images is synthesized by taking a linear combination of said training images weighted by said parameter set.

8. A method of synthesizing a new target image by mapping image parameters from a source image set to a target image set, comprising:

defining a first set of image parameters for said source image set by using a subset of said source image set as a source training subset;

mapping said first set of image parameters to a second set of image parameters by using a subset of said target image set as a target training subset;

determining image parameters of a first image in said source image set based on pixelwise optical flow among ones of said source image set, said pixelwise optical flow providing a pixel-by-pixel position of said first image with respect to a reference; and synthesizing said new target image from said target image set by applying said determined image parameters of said first image to said target image set.

9. A method of synthesizing a novel image from a single example image, comprising:

determining a mapping for pixelwise image changes by comparing prototype images in a prototype image set;

determining a pixelwise correspondence between said example image and one of said prototype images using pixelwise optical flow; and synthesizing said novel image responsive to the results of said determining a pixelwise correspondence and responsive to said determining a mapping.

10. An image processing system, comprising:

an optical flow processor adapted to determine pixelwise optical flows among a plurality of applied images, the pixelwise optical flows providing pixel-by-pixel positions of said applied images with respect to a reference; and an image synthesizer coupled to said optical flow processor and adapted to synthesize novel images using said pixel-by-pixel positions.

11. An image processing system as in claim 10, wherein said image synthesizer is implemented as a neural network.

12. An image processing system as in claim 10, wherein said novel images are defined by parameter vectors and wherein said image synthesizer uses said parameter vectors.

13. An image processing system, comprising:

an optical flow processor adapted to determine pixelwise optical flows among a plurality of applied images; and an image analyzer coupled to said optical flow processor and adapted to estimate parameters of applied novel images responsive to said pixelwise optical flows.

14. An image processing system as in claim 13, wherein said image analyzer is implemented as a neural network.

15. An image processing system, comprising:

a first optical flow processor adapted to determine first pixelwise optical flows among a plurality of applied source images, the first pixelwise optical flows providing pixel-by-pixel positions of said applied source images with respect to a reference;

an image analyzer coupled to said first optical flow processor and adapted to estimate parameters of applied novel images using said pixel-by-pixel positions; and an image synthesizer coupled to said second image analyzer and adapted to synthesize novel images using said estimated parameters.

16. An image processing system as in claim 15, wherein said source images represent a first object and said novel images represent a second object.

17. An image processing system as in claim 15, wherein said image synthesizer is remotely located from said image analyzer.

18. An image processing system as in claim 15, further comprising a second optical flow processor adapted to determine second pixelwise optical flows among a plurality of applied target images, wherein said image synthesizer is also adapted to synthesize novel images responsive to said second pixelwise optical flows.

19. A system as in claim 18, wherein said source images and said target images represent a single object.

20. A system as in claim 18, wherein said source images represent a first object and said target images represent a second object.

* * * * *

UNITED STATES PATENT AND TRADEMARK OFFICE
CERTIFICATE OF CORRECTION

PATENT NO.    : 5,745,668

DATED         : April 28, 1998

INVENTOR(S)   : Tomaso Poggio, David J. Beymer, and Amnon Shashua

It is certified that error appears in the above-identified patent and that said Letters Patent is hereby corrected as shown below:

```
Title page,
```
item [63], please replace "Continuation of Ser. No. 697,001" with

- - Continuation of Ser. No. 697,011 - - .

Signed and Sealed this

Thirtieth Day of June, 1998

Attest:

BRUCE LEHMAN

Attesting Officer

Commissioner of Patents and Trademarks